(12) United States Patent
Toyserkani et al.

(10) Patent No.: US 7,043,330 B2
(45) Date of Patent: May 9, 2006

(54) SYSTEM AND METHOD FOR CLOSED-LOOP CONTROL OF LASER CLADDING BY POWDER INJECTION

(76) Inventors: Ehsan Toyserkani, 756 Butternut Avenue, Waterloo, Ontario (CA) N2V 2M3; Amir Khajepour, 96 Keats Walk., Waterloo, Ontario (CA) N2K 3H1; Stephen F. Corbin, 17 Bismark Ave., Kitchener, Ontario (CA) N2H 5S6

( * ) Notice: Subject to any disclaimer, the term of this patent is extended or adjusted under 35 U.S.C. 154(b) by 26 days.

(21) Appl. No.: 10/697,552

(22) Filed: Oct. 31, 2003

(65) Prior Publication Data

US 2004/0133298 A1    Jul. 8, 2004

Related U.S. Application Data

(60) Provisional application No. 60/422,506, filed on Oct. 31, 2002.

(51) Int. Cl.
| | |
|---|---|
| G06F 19/00 | (2006.01) |
| G05B 13/02 | (2006.01) |
| G05B 19/18 | (2006.01) |
| B23K 26/00 | (2006.01) |
| H05B 6/00 | (2006.01) |

(52) U.S. Cl. ......................... 700/166; 700/30; 700/32; 700/33; 700/50; 700/54; 700/59; 700/60; 700/119; 700/120; 700/212; 219/121.6; 219/121.78; 219/121.82; 264/497

(58) Field of Classification Search ............ 700/28–30, 700/32, 33, 50, 54, 56, 59, 60, 63, 69, 70, 700/119, 120, 121, 123, 166, 212, 259; 219/76.13, 219/121.6, 121.62, 121.78, 212.82, 149, 219/152; 264/497; 427/508, 554, 586, 596
See application file for complete search history.

(56) References Cited

U.S. PATENT DOCUMENTS

| 5,517,420 A | | 5/1996 | Kinsman et al. |
| 5,619,589 A | * | 4/1997 | Otsu et al. .................. 382/160 |
| 5,659,479 A | | 8/1997 | Duley et al. |

(Continued)

FOREIGN PATENT DOCUMENTS

| WO | WO 01/36146 | 5/2001 |

OTHER PUBLICATIONS

Japanese Patent Abstract 07108390 published Apr. 24, 1995 for Cladding-Machinining Method and Cladding Machine; Inventor—Shibata Kimihiro.

(Continued)

*Primary Examiner*—Leo Picard
*Assistant Examiner*—Sean Schechtman
(74) *Attorney, Agent, or Firm*—Lynn C Schumacher; Hill & Schumacher

(57) ABSTRACT

A system is disclosed for monitoring and controlling laser cladding process by powder injection in real-time. The invention combines laser cladding technique along with automated direct feedback control to achieve a good quality clad in terms of dimensional and metallurgical characteristics. The system uses optical CCD-based detectors as the feedback system. The optical CCD-based detectors along with a pattern recognition algorithm is used to determine the clad characteristics in real-time. These characteristics are clad's dimensions, solidification rate, and roughness that are fed into a closed loop control system to adjust the laser power and table velocity to produce desired clad quality.

49 Claims, 9 Drawing Sheets

U.S. PATENT DOCUMENTS 5,961,861 A * 10/1999 McCay et al. ......... 219/121.83
6,046,426 A     4/2000 Jeantette et al.
6,122,564 A     9/2000 Koch et al.
6,459,951 B1   10/2002 Griffith et al.
6,869,508 B1 *  3/2005 Darolia et al. ......... 204/192.11

OTHER PUBLICATIONS

Jeng et al., Metal Rapid Prototype Fabrication Using Selective Laser Cladding Techncology, Advanced Manufacturing Technology, J AdV Manuf Technol (2002) 16, 681-687.

* cited by examiner a) Typical image from a normal view to process zone b) Processed image Main Control System

SYSTEM AND METHOD FOR CLOSED-LOOP CONTROL OF LASER CLADDING BY POWDER INJECTION

CROSS REFERENCE TO RELATED APPLICATIONS

This patent application relates to, and claims the priority benefit from, U.S. Provisional Patent Application Ser. No. 60/422,506 filed on Oct. 31, 2002 entitled SYSTEM AND METHOD FOR CLOSED-LOOP CONTROL OF LASER CLADDING BY POWDER INJECTION and which is incorporated herein in its entirety.

FIELD OF THE INVENTION

The present invention relates to an apparatus and method of producing coatings or cladding by laser processing of powder.

BACKGROUND OF THE INVENTION

Laser cladding by powder injection is one method for advanced material processing, which is used in manufacturing, part repairing, metallic rapid prototyping, and coating. A laser beam melts powder and a thin layer of the substrate to create a coat on the substrate. In this process, a great variety of materials can be deposited on a substrate to form a layer with a thickness of 0.1 to 2 mm. This technique can produce much better coating, with minimal dilution, minimal distortion, and good surface quality than other techniques such as arc welding and thermal plasma. These advantages have recently found attraction in industries for part manufacturing and metallic rapid prototyping, see J. Mazumder, D. Dutta, N. Kikuchi, A. Ghosh, "Closed loop direct metal deposition: art to part," Optics and Lasers in Engineering, Vol. 34, pp. 397–414, 2001. This method is also considered as the best way for manufacturing of smart parts and functionally graded parts, see L. Xue, A. Therialult, M. U. Islam, "Laser consolidation for the manufacturing of complex flex tensional transducer shells," Proceeding of ICALEO'2001, pp. 702–711, 2001.

In part manufacturing and metallic rapid prototyping using the laser cladding, similar to other rapid prototyping techniques, a three-dimensional CAD solid model is used to produce a part without intermediate steps. This approach to produce a mechanical component in a layer-by-layer fashion allows us to fabricate a part with features that may be unique to laser cladding prototyping. These features include homogeneous structure, enhanced mechanical properties, and complex geometry. However, the clad quality may vary significantly during a laser cladding process. Variations of the quality may even be observed between processing cycles performed by the same operating conditions. This poor reproducibility arises from the high sensitivity of laser cladding to small changes in the operating parameters such as laser power, beam velocity and powder feed rate, as well as to process disturbances such as variations in absorptivity. Finding an optimal set of parameters experimentally, and using them in an open loop laser cladding process may not result in a good quality clad due to disturbances in the system. As a result, a closed loop control system is essential for automating laser cladding process.

Some researchers have developed methods and systems for the control, improvement and monitor of laser cladding process. Their works fold into three categories: sensors for monitoring the process, closed loop control system, and especial devices for the process such as nozzles, powder feeder, optics, and motion systems.

Work on sensor development for real-time monitoring of laser material processing has been underway for several years. U.S. Pat. No. 5,659,426 and conference paper G. Kinsman, W. W. Duley, "Fuzzy logic control of $CO_2$ laser welding," Proceeding of ICALEO'1993, pp. 160–167, 1993, discloses how a vision system can be used to monitor the process zone for a laser material processing.

However, to date the use of vision systems based on CCD technology in which the output of vision system is used in a closed loop control system has been limited to the extraction of spatial information on the boundary of the interaction zone (melt pool) and determination of the number of bright pixels in the images (U.S. Pat. No. 5,659,479) or limited to the determination of clad height in an open-loop system (R. F. Meriaudeau, F. Truchetet "Image processing applied to laser cladding process," Proceeding of ICALEO'1 996, pp. 93–103. 1996). U.S. Pat. No. 6,122,564, and journal paper J. Mazumder, D. Dutta, N. Kikuchi, A. Ghosh, "Closed loop direct metal deposition: art to part", Optics and Lasers in Engineering, Vol. 34, pp. 397–414, 2001; and conference paper J. Choi, and Y. Hau, "Adaptive laser aided DMD process control," Proceeding of ICALEO'2001, pp. 730–738, 2001; disclose the use of a phototransistor for process monitoring of a laser cladding process with maximum 20 Hz. The use of a phototransistor in a closed loop system has been limited to the taking of clad height deviation in a desired threshold. This method provides the maximum 0.25 mm precision in produced parts.

Controller development for closed loop control systems has been carried out by several researchers. U.S. Pat. No. 5,659,426 and conference paper G. Kinsman, W. W. Duley, "Fuzzy logic control of $CO_2$ laser welding," Proceeding of ICALEO'1993, pp. 160–167, 1993, disclose a fuzzy logic controller for manipulating the laser processing variables such as laser power, laser intensity and laser beam velocity to control the penetration depth welding of material. International PCT Patent application 00/00921, journal paper J. Mazumder, D. Dutta, N. Kikuchi, A. Ghosh, "Closed loop direct metal deposition: art to part," Optics and Lasers in Engineering, Vol. 34, pp. 397–414, 2001 and conference paper J. Y. Jeng, S. C. Peng, C. J. Chou, "Metal rapid prototype fabrication using selective laser cladding technology," International Journal of Advanced Manufacturing Technology, Vol. 16, pp. 681–687, 2000; disclose a feedback controller for adjusting the laser power based on the presence or absence of the laser beam from the deposit. This controller trims the control analogue voltage, which is sent to the laser based on the TTL signal received from phototransistor. The modified analogue signal sent to laser causes the laser beam's shutter to be on and off for specific durations.

A few inventors have introduced new devices for the laser cladding process. U.S. Pat. Nos. 6,269,540; 6,268,584 and 6,046,426 disclose devices which can be used in parts production such as turbine blades, valves and so on. The devices present the use of different form of spray nozzles such as coaxial, and lateral. They also disclose the use of four separated laser beams where the spray nozzle is located in the middle of them, or the different orientation of laser beam relative to the workpiece and spray nozzle.

It would be advantageous to provide a method and apparatus to extract the clad characteristics such as dimensions and metallurgical qualities in real-time with high precision.

SUMMARY OF THE INVENTION

The present invention provides a method and system for monitoring and controlling laser cladding process by powder injection in real-time. The system combines laser cladding technique along with automated direct feedback control to achieve a good quality clad in terms of dimensional and metallurgical characteristics. The system uses optical image detectors such as CCD-based detectors as part of the detection and feedback system. The optical image detectors along with a pattern recognition algorithm is used to determine the clad characteristics in real-time. These characteristics are dimensions of the clad, solidification rate, and roughness that are fed into a closed loop control system to adjust the laser power and table velocity to produce desired clad quality.

In one aspect of the invention there is provided a system for producing a cladding on a substrate, comprising:

a) a laser for processing materials and focusing means for directing and focusing a laser light beam from said laser onto a substrate surface, a substrate holder and positioning means for adjusting the position of the laser light beam and the substrate with respect to each other, and powder injection means for injecting powder onto said substrate;

b) image detection means for capturing images of an interaction region between said laser light beam and powder injected onto said substrate surface; and c) a computer control means connected to said laser, said positioning means and said powder injection means, wherein said computer control means includes modeling means to model cladding growth by laser processing of powder, and extract from said model desired values for the pre-selected properties of the growing clad in real-time, and said computer control means including image processing means for processing images of the interaction region between said laser light beam and the powder injected onto said substrate surface and extracting from said images values of pre-selected properties of a growing clad in real-time, said computer control means including processing means to compare said extracted values of said pre-selected properties of the growing clad in real-time to desired values of said pre-selected properties of the growing clad produced by a model of cladding growth by laser processing of powder, and wherein said image processing means includes pattern recognition processing means to extract the pre-selected properties of a growing clad in real-time from images captured by the image detection means, said computer control means including intelligent process controller means interfaced to said laser, said intelligent process controller being a fuzzy logic controller including fuzzy logic membership functions, an inference engine and a defuzzification module, wherein said fuzzy logic membership functions are utilized to fuzzify the difference between first input signals, which are said extracted values of the pre-selected properties of the growing clad in real-time extracted by said pattern recognition processing means, and second input signals which are the desired values of the pre-selected properties of the growing clad, and wherein the inference engine combines the fuzzified difference between said first and second input signals, and wherein the defuzzification module defuzzifies outputs of the inference engine to convert them back into quantitative values, said guantitative values being output from the intelligent process controller means and used to adjust parameters of said laser light beam, the positioning means and said powder injection means to give the desired values of the pre-selected properties of the clad.

In another aspect of the invention there is provided a method for producing a cladding on a substrate, comprising:

a) injecting powder onto a surface of a substrate and directing and focusing a laser light beam having effective laser light beam parameters onto the substrate surface;

b) capturing images of an interaction region between the laser light beam and the powder injected onto the substrate surface using at least two image detectors; and c) processing the captured images of the interaction region between the laser light beam and the powder injected onto the substrate surface and extracting from the images pre-selected properties of a clad in real-time by merging of the images received from the at least two image detectors using an effective morphological structuring element neighborhood method, and to obtain therefrom two matrices, one of the matrices being a boundary matrix representing the clad's boundaries on the substrate and another matrix being an overlap matrix representing the overlap between the two images captured by the at least two image detectors, and calculating a difference between the extracted pre-selected properties to desired values of the pre-selected properties produced by an effective model of cladding growth by laser processing of powder, and using the difference to adjust processing parameters to give the desired real time values of the pre-selected properties of the clad.

A method for producing a cladding on a substrate, comprising:

a) injecting powder onto a surface of a substrate and directing and focusing a laser light beam onto the substrate surface;

b) capturing images of an interaction region between the laser light beam and the powder injected onto the substrate surface; and c) processing the captured images of the interaction region between the laser light beam and the powder injected onto the substrate surface and extracting from the images pre-selected properties of a growing clad in real-time, and calculating a difference between the extracted pre-selected properties to desired values of the pre-selected properties produced by an effective model of cladding growth by laser processing of powder, the step of calculating the difference between the extracted pre-selected properties to preferred values of the pre-selected properties produced by an effective model of cladding growth by laser processing of powder including fuzzifying the difference between the extracted pre-selected properties of the growing clad in real-time and the desired values of the pre-selected properties of the growing clad, combining the fuzzified difference between the extracted pre-selected properties and the desired values of the pre-selected properties of the growing clad using an inference engine to produce fuzzified outputs, and defuzzifying the fuzzified outputs to produce quantitative values, and using said quantitative values to adjust processing parameters to give the desired values of the pre-selected properties of the clad.

BRIEF DESCRIPTION OF THE DRAWINGS

Preferred embodiments of the invention will now be described, by way of example only, with reference to the drawings, in which.

DETAILED DESCRIPTION OF THE INVENTION

As used herein, the phrase "laser cladding process" means the laser powder deposition process in which a layer of material is deposited on a substrate by melting the powder and substrate by a laser. The phrase "Clad" refers to the deposited layer on the substrate. The process of making clads is called "cladding" and synonymously "coating" when the thickness of the clad is small and the process is used to coat the substrate with another material.

Figure 1:
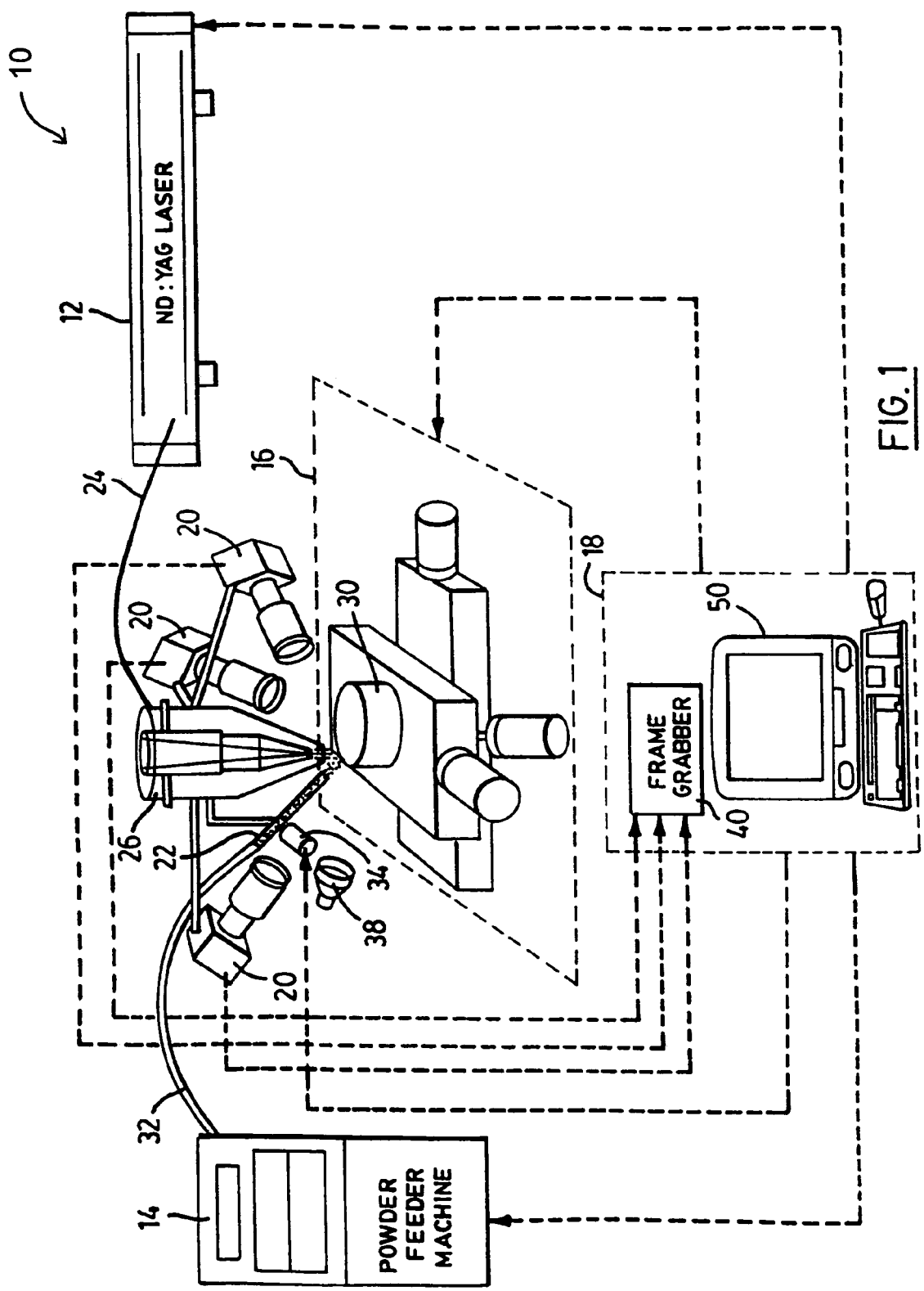
FIG. 1 is the closed loop control system for laser cladding by powder injection constructed in accordance with the present invention.

A schematic diagram of the system constructed according to the present invention is shown generally at 10 in FIG. 1. System 10 comprises a pulsed or continuous laser 12, a powder feeder machine 14, a CNC (Computerized Numeric Control) table, a robot or in general a positioning device 16. The main process controller 18 includes a computer, frame grabbers 40, image processing and pattern recognition software, and CAD/CAM software. The system includes optical CCD-based detectors 20 and a nozzle 22 for powder injection. Pulsed laser power source 12 is connected to a fiber optic 24 for transferring the light beam to processing head 26. In the case of continuous wave, a flying optic system should be used. The laser source 12 can be a continuous beam laser or a pulsed beam laser with enough power for melting the metallic material. The laser 12 has a communication port for sending and receiving the information to main controller 18.

The processing head 26 and/or the workpiece 30 can be moved by the robot or positioning device 16. The processing head 26 is connected to a shield gas such as argon and is integrated from the laser optical system and protective ceramic head.

The spray nozzle 22 delivers a continuous powder stream through tube 32. The powder stream with desired powder feedrate and shield gas rate is provided by powder feeder machine 14. The powder feeder machine provides a stable powder stream with high precision feedrate (typically less than ±0.1 g/min). The angle of nozzle 22 relative to the process zone can be changed by servo system 34. The powder spray from the nozzle 22 is directed toward the intersection of the laser beam and workpiece 30 and, as a result, the powder particles and a thin layer of substrate are melted. Due to the metallurgical fusion between the deposited layer and substrate a strong and uniform layer is built on the substrate. The number of nozzles in the process is not limited to 1, and a multi-nozzle or a coaxial nozzle system can be used.

The relative position and orientation of processing head 26 and workpiece 30 are commanded through the main process controller 18 to control the clad location and also the laser focal point and its orientation. The motion controller is able to adjust the relative velocity between the process spot and workpiece 30. Also, it traces the desired clad layer based on the CAD model of the workpiece available in the main controller 18. The CAD solid model of the desired object is sliced into many layers by a CAM technology off-line, and the location, height and width of each layer are used by the main process controller 18 to place and orient the workpiece 30 and process head 26. The layers characteristics could be changed during the process based on an adaptive slicing technology.

Figure 2:
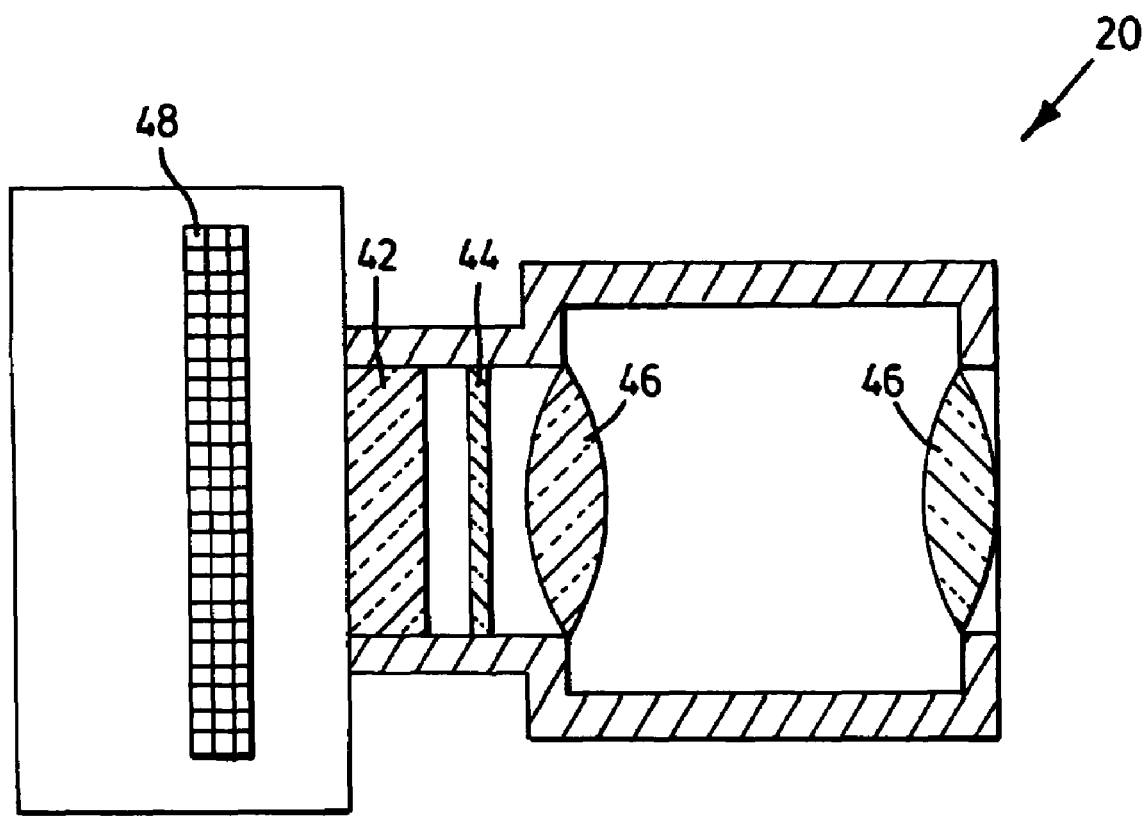
FIG. 2 shows an optical CCD-based detector (a part of the present invention)

The optical CCD-based detectors 20 in FIG. 1 monitor the processing zone illuminated by a halogen light 38. The CCD-based detectors are used to detect the clad's boundary. In general, the height of the clad may block the view of a CCD-based detector to see the complete boundary of the clad. As a result minimum of three CCD-based detectors are preferred to detect the complete clad's boundary. However, since the tip of the melt pool is essential for the dimension calculation, only two CCD-based detectors pointing to the tip of the clad are needed at any time. A switching system is used to connect two of CCD-based detectors to the frame grabber based on the trajectory of the layers. They are located at 120 degrees with respect to each other and with an angle of 20–30 degree with respect to horizontal line. Referring to FIG. 2, a charge coupled device (CCD) camera shown generally at 20 is used to provide images from the process zone. The images received on the CCD detector array 48 are then received by frame grabber 40 as shown in FIG. 1. In the process zone, the high temperature of the melted pool emits lights with different intensities and wavelengths. In addition, plasma and vaporized metal illuminate the melt pool. In order to filter undesired wavelengths, CCD camera 20 with size of ⅓" includes an interference filter 42 with bandwidth of 500–700 nm plus a neutral filter 44 with natural density (ND). Magnification lenses 46 with Focal length of 50 mm and Iris range of F1.8 are used to magnify the process zone.

Referring again to FIG. 1, the frame grabber 40 captures the images from the optical CCD-based detectors 20. The size of original images is 640*480 pixels. To reduce the computational time, the preprocessing procedure is performed inside the frame grabber 40. The preprocessing reduces the images to the size of 116*167 and limits them to the location of centerline of the laser beam in right hand of images and to the surface of substrate in the bottom part of the images. Also, in the preprocessing procedure, the images brightness and contrast are decreased and increased by 10%, respectively. FIG. 3a shows a typical image after preprocessing.

The preprocessed images are then inputted into computer 50 and fed into an algorithm developed for pattern recognition in the main controller 18. The software processes the images and finds the dimensions and rate of solidification of the clad in real-time based on the angle of solid/liquid interface. The algorithm comprises the steps of:

a) Creation of a binary image by a threshold rule for example Otsu method with an adaptive threshold level. With this technique the grayscale or color image is converted into only black and white picture in which the black and white areas indicate the melting and solid areas of the clad and substrate. The Otsu method is based on a fuzzy image processing strategy; as discussed in R. H Tizhoosh and H. Haußecker "Fuzzy Image Processing: An Overview", by Jähne, B., Haußecker, H., Geißler, P. (Eds.), HANDBOOK ON COMPUTER VISION AND APPLICATIONS, Academic Press, Boston, 1999, pp. 683–727, ISBN: 0123797705.

b) Projection of the two images received from two CCD-based image detectors on the reference flat surface (i.e. substrate plate). Since the cameras have an angle with the substrate and also the clad trajectory, the images are projected onto a reference plane using a transformation matrix that is obtained based on the orientations of the cameras with respect to the reference plane. This reference plane is usually the substrate plane.

c) Merge of the images obtained from optical CCD-based detectors by a morphological structuring element neighborhood method to obtain two matrices, one for the clad's boundaries on the substrate (boundary matrix) and another for the overlapped between the two images of the CCD-based detectors (overlapped matrix).

d) Determination of the clad's dimensions using the two matrices by the developed pattern recognition algorithm. The boundary matrix is used to detect the width of the clad and the combination of the boundary and overlap matrices are used to extract the height and the angle $\alpha$. The angle $\alpha$ can also be obtained directly from the binary images of the CCD-based cameras. For instance, the clad's width can be calculated based on the number of bright pixels in the desired column of the boundary matrix. Also, the uncalibrated clad's height for any corresponding column in the boundary and overlap matrices is extracted by counting the number of pixels between the clad's boundary and the overlap boundary matrices. The actual clad's height is obtained using the number of pixels explained above and considering the scaling factor of the image and the CCD-Based detectors angles with the substrate. The angle of solid/liquid interface $\alpha$ is obtained directly from CCD-Based detectors images. The angle between the border of the bright area in the tail of the melting pool seen by each CCD-Based detector and a reference horizontal line along with the relative orientation of the CCD-based detectors and the clad trajectory is used to extract the solid/liquid interface angle $\alpha$. The corresponding location of any pixel in the matrices is obtained after calibration of the CCD-based detectors using the image of a part with known dimensions.

e) Determination of the clad's roughness and quality by analyzing the fluctuation of the clad's height obtained in Step 3. Large fluctuations in the clad's height indicate rough surface or porous clad while lower fluctuation is an indication of high quality clad with good surface finish.

f) Extraction of the solidification rate based on the work disclosed in P. Gilgien and W. Kurz", Microstructure and phase selection in rapid laser processing" in Laser Processing Surface Treatment and Film Deposition, Edited by J. Mazumder et al. NATO Series E: Applied sciences, Vol. 307, pp. 77–92, 1996.

Figure 3:
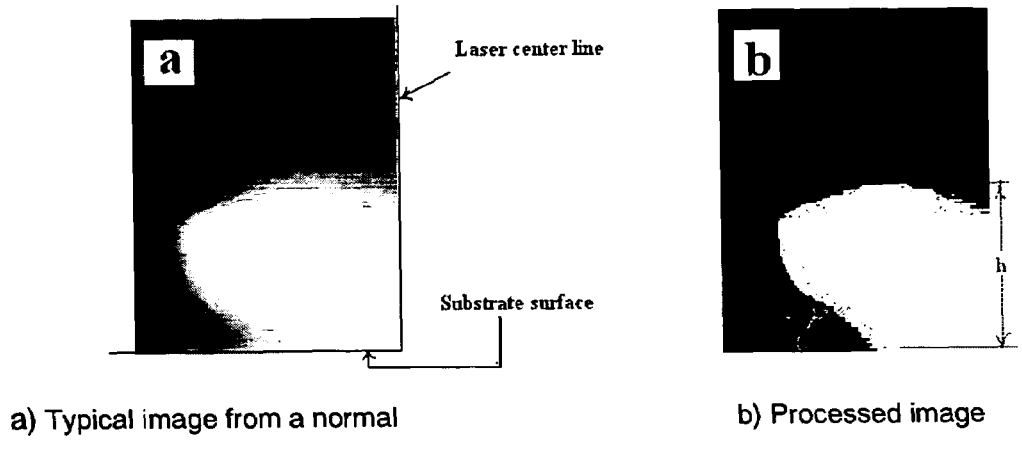
FIG. 3a) shows a typical raw image of the process zone.
FIG. 3b) shows the process zone after processing the image.

Studies by the inventors have shown that the height of the melt pool at 0.6 mm away from the laser centerline gives the most precise height. The angle of the melt pool $\alpha$ shown in FIG. 3b is also obtained using the pattern recognition algorithm. The angle $\alpha$ can be used to determine the rate of solidification as reported in P. Gilgien and W. Kurz "Microstructure and phase selection in rapid laser processing" in Laser Processing Surface Treatment and Film Deposition, Edited by J. Mazumder et al. NATO Series E: Applied sciences, Vol. 307, pp. 77–92, 1996. Having the rate of solidification and temperature gradient, microstructure of the clad can be determined in real-time. The metallurgical properties can then be extracted from the microstructure of clad. In this strategy, the rate of solidification can be obtained if the angle $\alpha$ (shown in FIG. 3-b) and the process speed (U) are known. Knowing these two parameters, the rate of solidification ($U_r$) can be obtained from $U_r = U \cos(\alpha)$.

The microstructure of the solidified metal (clad) is directly dependent on the rate of solidification and can be experimentally obtained for any material. In general, higher rate of solidification results in finer microstructure which improves the mechanical properties of the clad. In P. Gilgien and W. Kurz "Microstructure and phase selection in rapid laser processing" in Laser Processing Surface Treatment and Film Deposition, Edited by J. Mazumder et al. NATO Series E: Applied sciences, Vol. 307, pp. 77–92, 1996, the dependency of the microstructure of Al—Fe to its rate of solidification is provided in the form of graphs.

Referring again to FIG. 1, the main controller 18 commands positioning device 16, laser 12, and powder feeder machine 14 and receives the preprocessed images from the frame grabber 40 for further analysis. The main controller 18 includes the following software modules:

1) CAD/CAM module to extract data from a computer solid model of an object for the position, height, and width of the desired clad. The computer solid model can be generated using available commercial software packages and after importing the model into this software, the necessary information is extracted. An adaptive slicing technology can be integrated with the main controller to update the thickness of the sliced layers in the CAD/CAM system based on the real thickness of the layer received from the CCD-based detectors.

2) Pattern recognition software to obtain clad's dimensions and rate of solidifications based on the information extracted in step 1 above. This software is used to detect the clad's geometry, rate of solidification, and roughness. The software can be developed with any commercial computer programming languages for implementing the pattern recognition algorithm discussed above.

3) Intelligent process controller to adjust the laser energy, table velocity, powder feedrate, and nozzle orientation. The controller is discussed in detail in the following.

4) Interface protocols for motion control, laser, powder feeder machine, and frame grabber. The interfaces can be developed in any programming language and in our experiments C++ along with a QNX real-time operating system has been used, The interfaces are used for the communication of the central controller (e.g. a personal computer) with the laser, powder feeder, sensor system, and positioning device.

Figure 4:
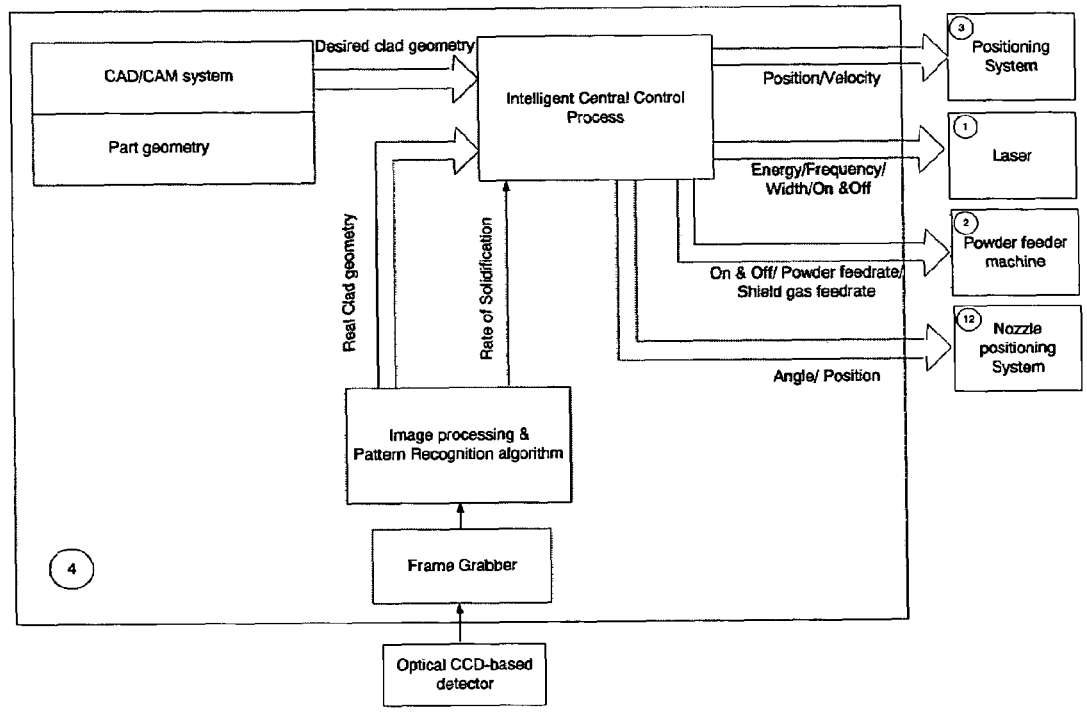
FIG. 4 is a block diagram of the main control system of the apparatus shown in FIG. 1.

The structure of the main central system is shown in FIG. 4. As seen in this figure the feedback signals coming from CCD-based detectors are captured by a frame grabber and after the pattern recognition discussed above, the geometry and quality of the clad are determined. The geometry and quality of the clad are compared with the desired values generated by the CAD/CAM module in the central processor 18. The errors between the desired and actual geometry and quality of the clad are manipulated by an intelligent process control housed in the central controller to command and adjust the laser 12, powder federate 14, and positioning device (robot) 16.

The intelligent process controller can be based on different existing control methods including fuzzy logic, neural network, PID controller, state space, and the like. A fuzzy controller and a model-based nonlinear controller has been developed as part of system 10. The controller developed for system 10 has three distinct parts: (1) Fuzzy logic Membership Functions (FMF), (2) inference engine and (3) defuzzification module. The FMF are utilized to fuzzify the difference between the inputs, which are the analogue signals from CCD-based optical detectors' interface (clad height, clad width, rate of solidification and clad roughness) and the desired clad characteristics. The desired clad characteristics include geometrical properties (height, width) provided by the CAD/CAM module and roughness and rate of solidification supplied to the controller by the user. The fuzzifications are performed using the defined membership functions. In the fuzzification process quantities are replaced with qualitative linguistic parameters as discussed in J. S. R. Jang, C. T. Sun and E. Mizutani "Neuro-Fuzzy and Soft Computing" Prentice Hall, 1997. Some of the rules used in the controller are as follows:

1) If the difference between the height of clad and desired height is "more and less" high AND the roughness difference is "good" AND the clad width difference is "good" AND the difference between the rate of solidification and desired value is "low" then the process velocity is "a little high" OR the power is "a little low".
2) If the height of clad difference is "good" AND the roughness difference is "good" AND the difference between the clad width and desired value is "low" AND the rate of solidification difference is "good" then the process velocity is "a little low" OR the power is "a little high".

The outputs of the fuzzifications are then fed into the inference engine such as Mamdani as discussed in J. S. R. Jang, C. T. Sun and E. Mizutani "Neuro-Fuzzy and Soft Computing" Prentice Hall, 1997 to combine the rules. The outputs of the inference engine are fed into the defuzzification module where qualitative parameters are converted back into quantitative values. The outputs of the controller are sent to the laser, positioning device and powder feeder through the interfaces. In the central controller algorithm, the materials quality has been incorporated by considering two parameters: Effective Energy density ($E_{eff}$) and the Effective Powder Deposition Density ($PDD_{eff}$). These two parameters are used in the controllers for tuning the process parameters in valid ranges. These two parameters will be disclosed in the following application of the apparatus.

The present invention will be illustrated using a non-limiting example of the fabrication of a clad using the method.

Fabrication of High Performance Fe—Al Coatings using Closed-Loop Controlled Laser Cladding by Powder Injection The closed-loop controlled powder injection laser cladding described above can be used to produce high quality, high performance coatings. Examples of its use will be described below with respect to an Iron-aluminum alloy cladding (or coating). However it should be understood that the technique is not limited to this coating composition.

Interest in developing iron-aluminide alloys for high temperature applications has existed for several years primarily due to their superior high temperature oxidation and sulfidation resistance [1–4]. These alloys are lower in cost and have better corrosion resistance compared to conventional Ni-based and stainless steel type alloys [1]. This corrosion resistance has been attributed to a strong, adherent surface layer of aluminum oxide that is stable under a wide range of environments [2]. Due to their ordered structure (based on $Fe_3Al$ and $FeAl$ intermetallic phases) they also possess good high temperature strength [3]. However these alloys are susceptible to hydrogen-induced embrittlement, which can cause poor room temperature ductility and low strength at higher temperatures [4–7]. This problem has deterred acceptance of this alloy for structural applications in bulk form. The degree of embrittlement increases with an increase in Al content. At Al contents below about 10 wt % the alloy is ductile [5,7]. Ductility dramatically decreases above 10 wt % Al [5]. Unfortunately corrosion resistance below 10 wt % Al, where the material is ductile, is poor because of the materials inability to form a continuous oxide surface layer [1].

The possibility of producing iron-aluminide coatings on less corrosion resistant materials, such as low carbon and stainless steels, has recently been investigated [2,4]. This approach could potentially take advantage of the materials excellent corrosion resistance without encountering the structural problems of the material in bulk form. These coatings were produced by weld overlay cladding processes using gas tungsten arc (GTA) and gas metal arc (GMA) welding techniques. The results indicate that at cladding contents above 10 wt % Al, cold cracking in the iron-aluminide cladding occurs in a similar manner to that observed in bulk samples.

In the current method the development of a high performance (i.e. crack free, fine grained, high hardness) iron-aluminide coating with an Al content of 20 wt % Al has been placed on mild steel using the closed-loop controlled laser cladding-powder injection process discussed above. While this composition of Al was used in the examples below, it should be recognized that the method could be used to produce coatings with Al contents from 0 to 100%, although contents of 10 to 60 wt % would be preferred embodiments.

In this method a stream of pure Fe and Al powders, pre-mixed to a specified bulk composition (eg. Fe-20 wt % Al) is fed into a surface layer of the substrate which is simultaneously melted by a pulsed Nd:YAG laser. The heat provided by the laser also melts the powder stream, which then mixes with the molten substrate surface. Upon cooling and solidification, a fusion bond is formed between the clad material and substrate. The advantages of the laser cladding-powder injection process include chemical cleanliness, localized heating, low dilution of the cladding material by the substrate and rapid cooling rates [8,9]. The rapid cooling rates can result in fine scaled microstructures, extended solubility and uniform solute distributions. In the current method it is these characteristics that have lead to a fine grained, crack free Fe-Aluminide coating with a high Al content and high hardness.

Several process conditions determine the quality of a metal deposit produced on a substrate by laser cladding. They include the laser energy, E (measured in Joules, J), the processing speed U, which in this case is determined by the velocity of the substrate (measured in millimeters per second, mm/s), the powder feed rate, R (measured in grams per second, g/s) and the laser beam spot size focused onto the substrate surface, D (measured in millimeters, mm). In the current case, where the laser operates in a pulsed mode, the laser energy must be expressed per pulse and the frequency of the pulse, F (measured in Hz) and the pulse duration, W (measured in milliseconds, ms) must also be specified. In these cases the average power delivered by the laser is also often expressed as $P_{ave.}=EF$ (measured in watts, W). In summary there are 6 important processing parameters in pulsed laser cladding including E, U, R, F, W, D.

In the examples given below these processing parameters were varied in order to determine the conditions which produced a high quality clad deposit. They also demonstrate how the closed-loop control system can be used to adjust these conditions in real time and use them to control the process.

EXAMPLE 1

In this example a series of experiments were carried out where the powder feed rate, R and spot size, D were held constant while other processing conditions were varied. Table 1 indicates the series of experiments under investigation. Within series A, B and C the pulse frequency and duration were held constant. Also within a series, several experiments were performed at constant but different substrate velocities (e.g. A1, A2, etc. ). For each of these experiments the pulse energy was ramped from 2 to 4 J/pulse in increments of 0.5 J. During a single experiment a CCD-based detector viewed the cladding produced along a mild steel substrate where the clad height and solid/liquid solidification angle were continuously measured.

TABLE 1

| | Laser processing parameters | | | |
|---|---|---|---|---|
| Condition | F (Hz) | W (ms) | E (J) | U (mm/s) |
| A1 | 100 | 3.0 | 2 to 4 | 0.75 |
| A2 | 100 | 3.0 | 2 to 4 | 1.00 |
| A3 | 100 | 3.0 | 2 to 4 | 1.25 |
| A4 | 100 | 3.0 | 2 to 4 | 1.50 |
| A5 | 100 | 3.0 | 2 to 4 | 1.75 |
| A6 | 100 | 3.0 | 2 to 4 | 2.00 |
| B1 | 80 | 4.1 | 2 to 4 | 0.75 |
| B2 | 80 | 4.1 | 2 to 4 | 1.00 |
| B3 | 80 | 4.1 | 2 to 4 | 1.25 |
| B4 | 80 | 4.1 | 2 to 4 | 1.50 |
| B5 | 80 | 4.1 | 2 to 4 | 1.75 |
| C1 | 50 | 6.4 | 2 to 4 | 1.00 |
| C2 | 50 | 6.4 | 2 to 4 | 1.25 |
| C3 | 50 | 6.4 | 2 to 4 | 1.50 |

Figure 5:
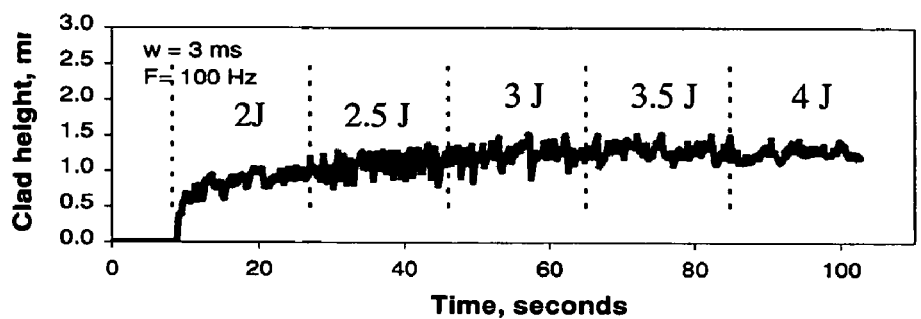
FIG. 5 shows continuous measure of clad height during the cladding process for condition A3 of Table 1.

FIG. 5 illustrates the clad height readings obtained from the CCD-based detector during clad experiment A3 of Table 1. Also shown are the incremental steps in laser energy E that occurred during the experiment. The clad height increases as the laser energy increases. However what is much more important is the change in the variations in clad height measured by the CCD-based detector. As the laser energy increases the clad height variation decreases.

Figure 6:
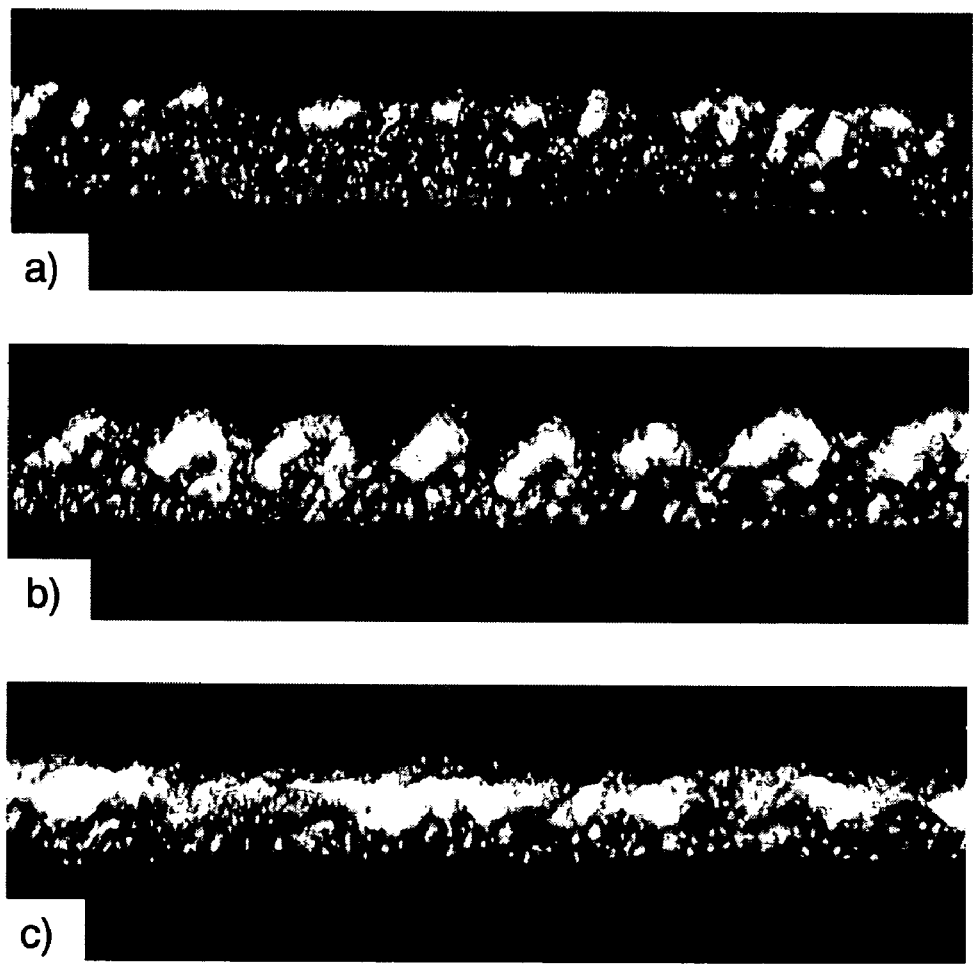
FIG. 6 shows three stereographs of the as-deposit clad for condition A3 at laser energies of; a) 2J, b) 3J and c) 4J.

The impact of this variation in clad height on clad quality is illustrated in FIGS. 6a), 6b) and 6c) which show stereographs of the clad structure from experiment A3 at laser energies of 2, 3 and 4 J/pulse. FIG. 6a) indicates that at low laser energy the clad has a dull finish which is indicative of the deposition of powders that have not been completely melted by the laser. At intermediate laser energies (FIG. 6b)) melting of the deposited powder increases, as indicated by the bright areas of the clad, but the clad surface is very rough. This corresponds to the measurements of FIG. 5 where the variability of clad height is large at energy levels of 2.5 and 3. At the highest energy levels the variability in clad height is significantly reduced and, as indicated in FIG. 6c), this results in a completely melted, high quality clad deposit with a smooth surface finish.

Figure 7:
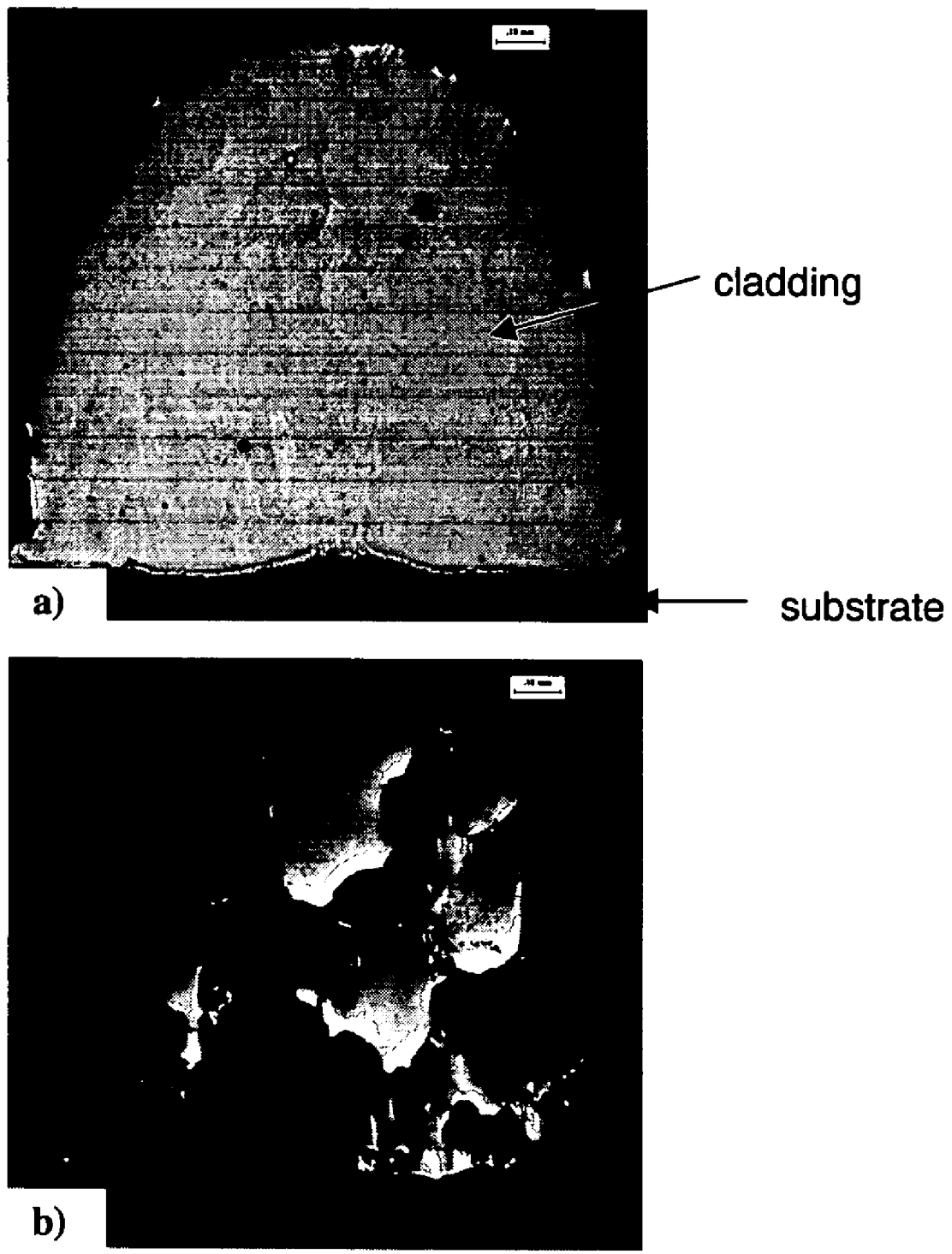
FIG. 7 shows the macrostructure of clad/substrate interface for a) E=4J and b) E=2J.

FIGS. 7a) and 7b) shows the clad/substrate macrostructure for cross sections of the as-deposited clad taken at laser energy inputs of 2 and 4 J. Clearly the area of the clad which possess a smooth surface finish and small clad height deviation in FIGS. 5 and 6 corresponds to a clad deposit which is well consolidated, with negligible porosity, a homogenous composition, low dilution and excellent bonding with the substrate. Conversely, an area of the clad which corresponds to a discontinuous deposit, large height deviation and rough surface, exhibits a very porous deposit which is poorly bonded to the substrate.

Figure 8:
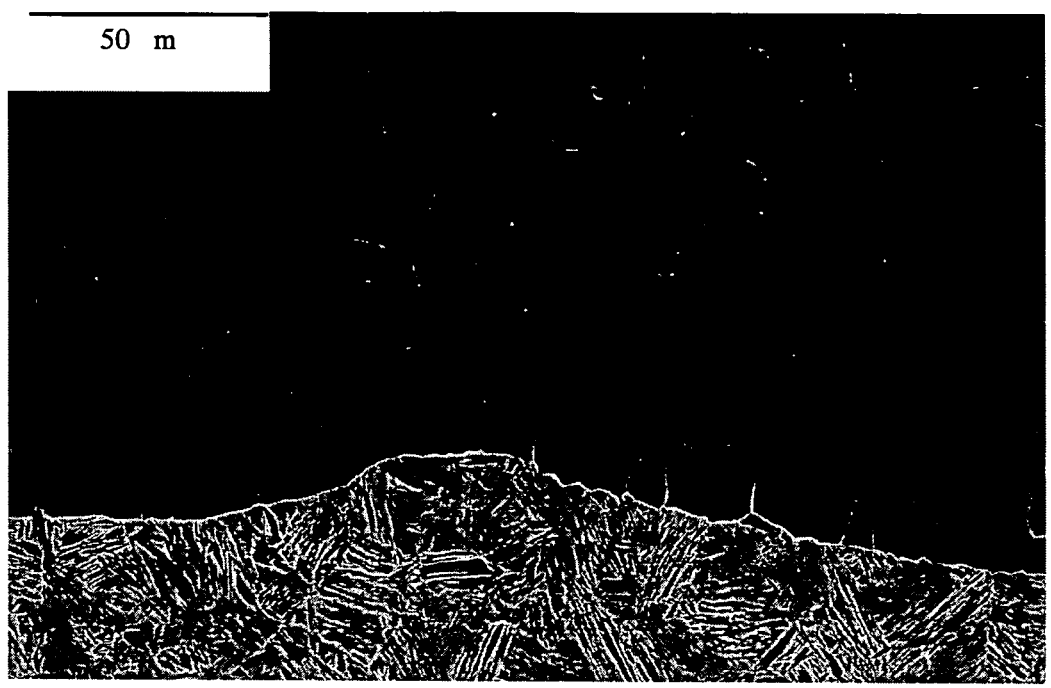
FIG. 8 shows the microstructure of an as deposited clad under processing conditions which gave rise to a small clad height deviation and therefore high quality clad.

FIG. 8 illustrates the microstructure of an Fe—Al cladding and the clad/substrate interface. This microstructure is typical of that achieved under processing conditions which have low clad height deviation measured from the CCD-based detector. Again the Figure indicates that these conditions produce a very dense clad with a high density, homogenous structure and fine grain size (i.e. about 15 microns). In addition no cracks were observed in the cladding or at the clad/substrate interface when these processing conditions were achieved.

Figure 9:
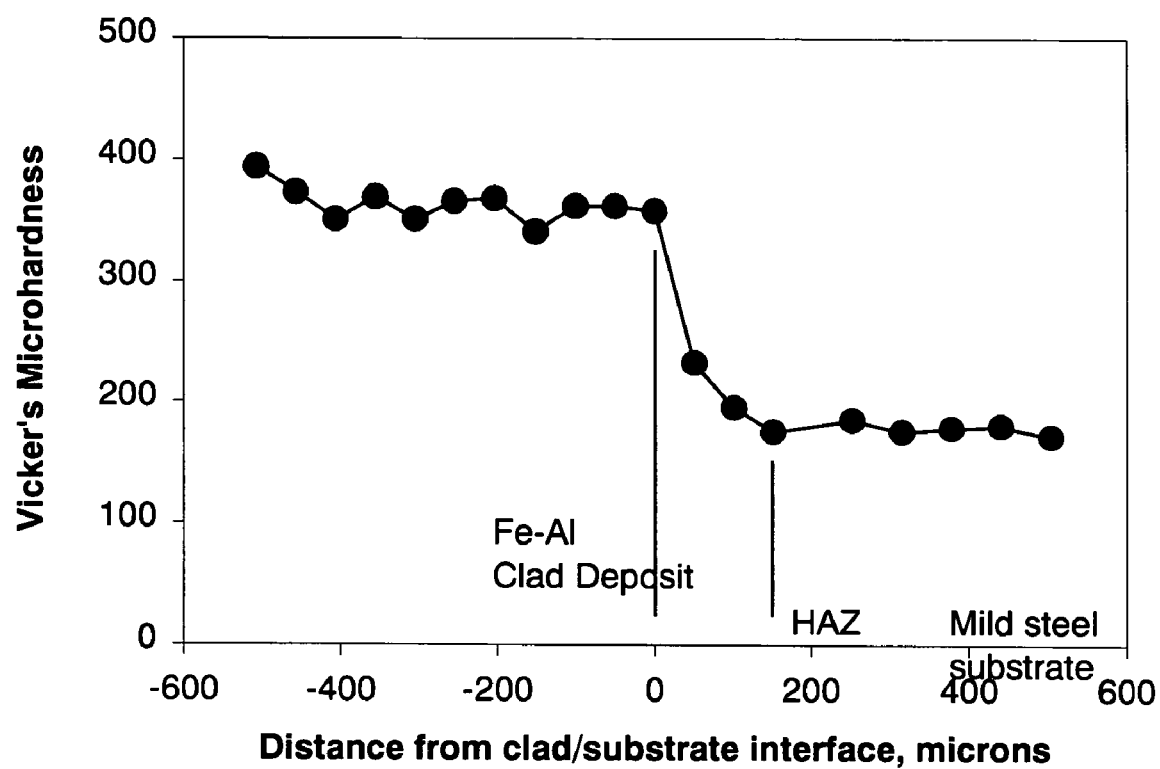
FIG. 9 shows microhardness profile for a clad/substrate region of an as-clad deposit under conditions which produced a high quality clad.

The hardness of a clad sample similar to that of FIG. 8 was measured across the bond area using a Vicker's microhardness instrument. The results are shown in FIG. 9. Clearly the hardness on the clad deposit is much higher that the steel substrate that it has coated. The hardness steadily rises within the heat affected zone (HAZ) of the substrate until it reaches a value two times higher than the substrate, in the clad deposit. This hardness is significantly higher than that reported for weld overlay techniques {2,3]. This is likely due to the much fine grain size produced in this laser cladding process compared to welding approaches (i.e. 15 versus 350 to 500 microns).

The determination and real time control of clad quality through real time measurements of clad height deviation can be done for all of the processing conditions described in Table 1 which include variations in E, W, F, and U. These conditions can be summarized and compared by developing expressions that can take into account the pulse characteristics of the laser as well as the process speed (i.e. U). This can be done by first expressing the effective surface area of the substrate that is irradiated by the laser and powder stream. This is determined by the substrate velocity but also the pulse characteristics of the laser. The irradiated area can be expressed as;

$$A_{\mathit{eff}} = \begin{cases} \dfrac{\pi D^2}{4} + UD - 2F\left[\dfrac{1-FW}{2F}UD - \dfrac{1-FW}{2F}yU - \dfrac{D^2}{4}\left(\dfrac{\pi}{2} - \sin^{-1}\left(\dfrac{2y}{D}\right)\right)\right] & \text{for } D > \dfrac{1-FW}{F}U \\ \dfrac{\pi D^2}{4}F + UWDF & \text{for } D \leq \dfrac{1-FW}{F}U \end{cases} \quad [1]$$

where F, W, D and U all have their previous meanings, and $$y = \sqrt{\dfrac{D^2}{4} - \left(\dfrac{1-FW}{2F}U\right)^2}.$$

Clearly the area irradiated is dependent on the substrate velocity but also on the laser spot size, pulse duration and frequency. The Effective Energy Density ($E_{\mathit{eff}}$) and the Effective Powder Deposition Density ($PDD_{\mathit{eff}}$) can then be calculated as;

$$E_{\mathit{eff}} = (EF)/A_{\mathit{eff}} \quad [2]$$

$$PDD_{\mathit{eff}} = (RFW)/A_{\mathit{eff}} \quad [3]$$

where E, and R have their previous meaning.

Inherent in equation [3] is that, when the laser is off during pulsing, no powder is deposited on the substrate, due to the absence of energy provided by the laser to create the clad. This aspect of deposition is introduced through the inclusion of the duty cycle C (i.e. C=FW) in equation [3].

Figure 10:
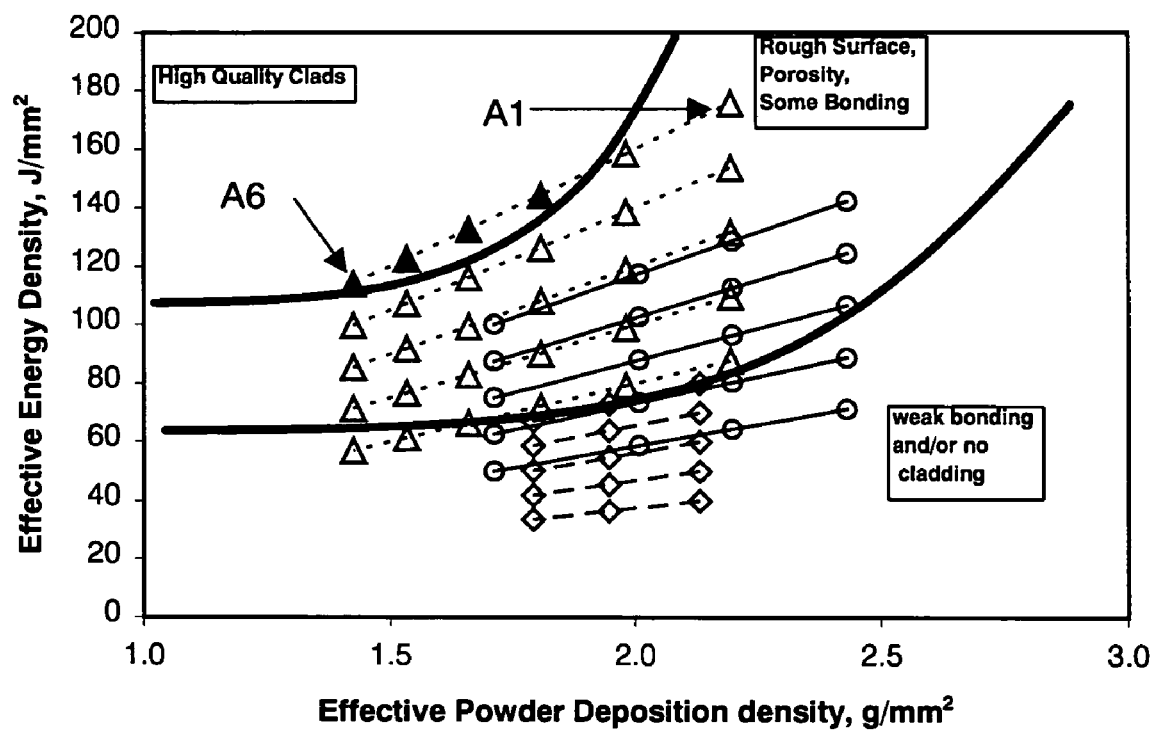
FIG. 10 shows the effective energy and powder deposition density for all of the process conditions used in Table 1. Closed symbols indicate conditions that gave rise to a high quality as determined by the CCD-based detector clad height variation measurements. Lines link together conditions within a set (i.e. A, B, C) which had the same laser energy input but different substrate velocities. Low substrate velocities (i.e. high powder deposition rates) are in the upper right hand corner of the figure. (Δ –A1 to A6; ° –B1 to B5; ◊ –C1 to C3)

The use of the terms $E_{\mathit{eff}}$ and $PDD_{\mathit{eff}}$ now allows the direct comparison of the conditions of Table 1 and the construction of a processing map. FIG. 10 shows such a construction which shows the effective energy and powder deposition density for all of the process conditions used in Table 1. Closed symbols indicate conditions that gave rise to a high quality as determined by the CCD-based detector clad height variation measurements. Lines link together conditions within a set (i.e. A, B, C) which had the same laser energy input but different substrate velocities. Low substrate velocities (i.e. high powder deposition rates) are in the upper right hand corner of the figure. (Δ –A1 to A6; ° –B1 to B5; ◊ –C1 to C3).

Clearly a specific combination of effective energy density and effective powder deposition density must be met before a good quality clad can be produced. Furthermore, through equations [1] to [3], these combined conditions define a set of processing parameters, including powder feed rate, substrate velocity, laser spot size, and laser pulse energy, frequency and duration which must be used to produce a high quality clad. Finally the $E_{\mathit{eff}}$ and $PDD_{\mathit{eff}}$ combinations which give rise to high quality clads can be used in a closed-loop control system as a constraint for adjusting process parameters and continuously produce a high quality cladding.

Example 2

In this example a series of experiments were carried out where the powder feed rate, R and spot size, D were held constant while other processing conditions were varied. Table 2 indicates the series of experiments under investigation. Within series D and E the pulse energy and duration were held constant. Also within a series, experiments were performed at constant but different substrate velocities (e.g. E1, E2, E3). For each of these experiments the pulse frequency was ramped from 40 to 100 Hz in increments of 15 Hz. During a single experiment the cladding produced along a mild steel substrate was viewed by a CCD-based detector where the clad height and solid/liquid solidification angle were continuously measured.

TABLE 2

| | Laser processing parameters | | | | |
|---|---|---|---|---|---|
| Condition | F (Hz) | W (ms) | E (J) | U (mm/s) | C (F*W) |
| D1 | 40 to 100 | 3.0 | 4 | 1.00 | 0.12 to 0.30 |
| D2 | 40 to 100 | 3.0 | 4 | 1.50 | 0.12 to 0.30 |
| E1 | 40 to 100 | 3.0 | 5 | 1.25 | 0.105 to 0.285 |
| E2 | 40 to 100 | 3.0 | 5 | 1.5 | 0.105 to 0.285 |
| E3 | 40 to 100 | 3.0 | 5 | 1.75 | 0.105 to 0.285 |

Figure 11:
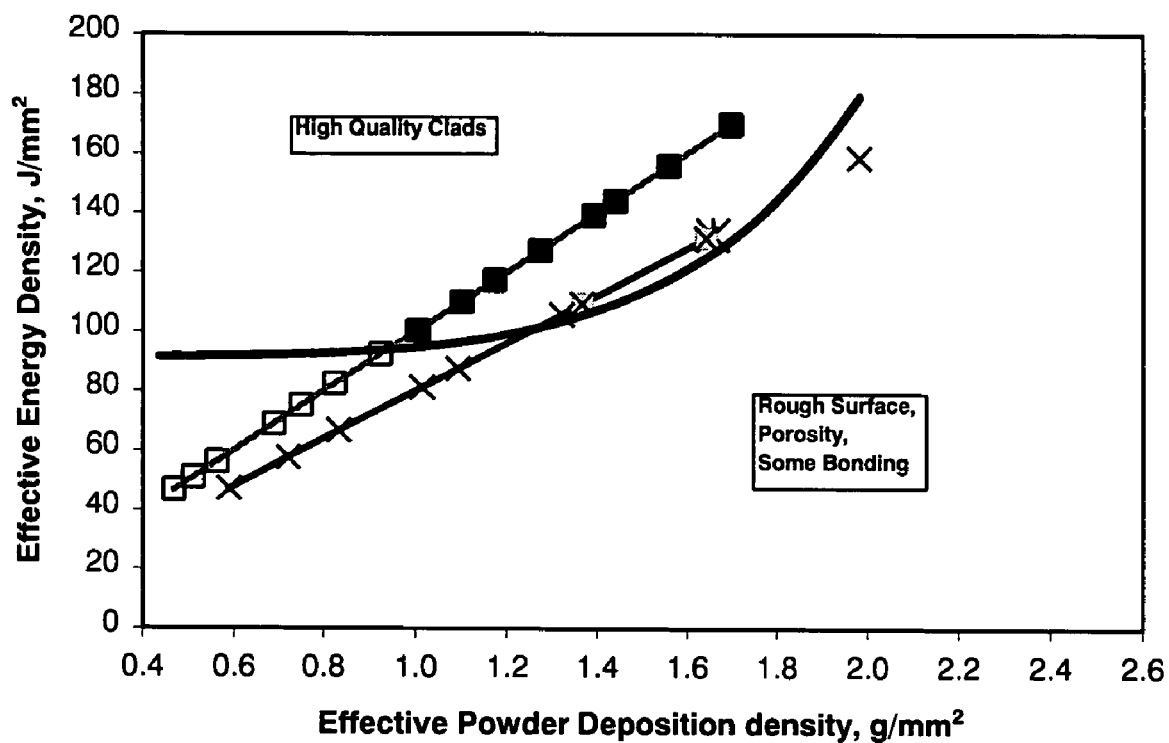
FIG. 11 shows the effective energy and powder deposition density for the process conditions of Table 2. Closed symbols indicate conditions that gave rise to a high quality clad as determined by the CCD-based detector clad height variation measurements. Lines link together conditions within a set (i.e. D and E) which had the same laser energy input but either different substrate speed of pulse frequency (X –D1 to D2; □ –E1 to E3).

FIG. 11 shows the effective energy and powder deposition density for the process conditions of Table 2. Closed symbols indicate conditions that gave rise to a high quality clad as determined by the CCD-based detector clad height variation measurements. Lines link together conditions within a set (i.e. D and E) which had the same laser energy input but either different substrate speed of pulse frequency. (X –D1 to D2; □ –E1 to E3).

Unlike Example 1 the pulse frequency (along with substrate velocity) were varied in this example. However using the same techniques as described above a specific combination of effective energy density and effective powder deposition density could be defined where a good quality clad can be produced. Again the CCD-based detector real time measurements of clad height deviation can also be used in a closed-loop control system to adjust process parameters and continuously produce a high quality cladding.

The process discussed above can be performed without the detection device disclosed here however, the closed loop system allows real-time control over the substrate velocity, powder stream feed rate and laser conditions (including energy delivered, pulse duration and frequency) in order to achieve the desired microstructure in the clad coating. It does this primarily through the real time manipulation of the clad's height and angle of its solid/liquid solidification front while the process parameters remain in the area labeled by "High quality clad" as shown in FIG. 10.

Process developments have defined a critical ratio between the laser energy input and powder deposition density that must be exceeded in order to produce a clad with little or no porosity and excellent bonding to the substrate. Providing this critical ratio is exceeded the composition, microstructure and consequently the properties of the Fe—Al cladding can be controlled through the real time manipulation of clad height and solid/liquid solidification angle.

In summary, the present invention provides several advantages, namely it provides a system for automatically controlling the laser cladding process and provides a closed-loop control strategy for adjusting the laser power, powder feedrate, and process speed. In one embodiment the invention provides an optical CCD-based detector for obtaining live pictures of the process zone. The control system provides pattern recognition methodology to determine clad dimensions and rate of solidification from the images provided by the optical CCD-based detector. The system provides a high speed feedback cycle rate (at least 25 Hz) to improve the controller performance and it provides a very accurate measurement of clad geometry with high precision (less than 0.1 mm). The system provides a measure for the microstructure of the clad in real-time by analyzing the rate of solidification. The present system also provides a measure for the clad quality (roughness, level of porous) in real time by analyzing the fluctuation in the clad's height and rate of solidification.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims.

REFERENCES

[1] Banovic, S. W., Dupont, J. N. and Marder, A. R., Experimental Evaluation of Fe—Al Claddings in High-Temperature Sulfidizing Environments, Welding Journal, 80, pg. 63s–70s, March, 2001.

[2] Banovic, S. W., Dupont, J. N., Tortorelli, P. F. and Marder, The role of aluminum on the weldability and sulfidation behavior of iron-aluminum claddings, Welding Journal, 78, No. 1, pg. 23s–30s, January, 1999.

[3] David, S. A., Horton, J. A., McKamey, C. G., Zacharia, T., and Reed, R. W., Welding Iron Alumindes, Welding Journal, 68, No. 9, pg. 372s–381s, September, 1989.

[4] Maziasz, P. J., Goodwin, G. M., Liu, C. T., and David, S. A., Effects of minor alloying elements on the welding behavior of FeAl Alloys for structural and weld-overlay cladding applications, Scripta Met. Mater., 27, No. 12, pg. 1835–1840, 1992.

[5] Vyas, S., Viswanathan, S. and Sikka, V. K., Effect of Aluminum content on environmental Embrittlement in Binary Iron-Aluminum Alloys, Scripta Met. Mater., 27, No. 2, pg. 185–190, 1992.

[6] Fasching, A. A., Ash, D. I., Edwards, G. R., and S. A. David, Hydrogen cracking behavior in an iron aluminide alloy weldment, Scripta Met. Mater., 32, No. 3, pg. 389–394, 1995.

[7] Woddyard, J. R., and Sikka, V. K., Effect of aluminum content on environmental embrittlement in binary iron-aluminum alloys-acoustic emission analysis, Scripta Met. Mater., 29, No. 11, pg. 1489–1493, 1993.

[8] Steen W. M. Laser Materials Processing, pg. 172–204, Springer-Verlag London Ltd., 1991.

[9] Kar, A. and Mazumder, J., One dimensional diffusion model for extended solid solution laser cladding, J. Appl. Phys. 61, (7), pg. 2645–2655, 1987.

Therefore what is claimed is:

1. A system for producing a cladding on a substrate, comprising:

a) a laser for processing materials and focusing means for directing and focusing a laser light beam from said laser onto a substrate surface, a substrate holder and positioning means for adjusting the position of the laser light beam and the substrate with respect to each other, and powder injection means for injecting powder onto said substrate surface;

b) image detection means for capturing images of an interaction region between said laser light beam and powder injected onto said substrate surface; and c) a computer control means connected to said laser, said positioning means and said powder injection means, wherein said computer control means includes modeling means to model cladding growth by laser processing of powder and extract from said model desired values for the pre-selected properties of the growing clad in real-time, and said computer control means including image processing means for processing images of the interaction region between said laser light beam and the powder injected onto said substrate surface and extracting from said images values of pre-selected properties of a growing clad in real-time, said computer control means including processing means to compare said extracted values of said pre-selected properties of the growing clad in real-time to desired values of said pre-selected properties of the growing clad produced by the model of cladding growth by laser processing of powder, and wherein said image processing means includes pattern recognition processing means to extract the pre-selected properties of a growing clad in real-time from images captured by the image detection means, said computer control means including intelligent process controller means interfaced to said laser, said intelligent process controller being a fuzzy logic controller including fuzzy logic membership functions, an inference engine and a defuzzification module, wherein said fuzzy logic membership functions are utilized to fuzzify the difference between first input signals, which are said extracted values of the pre-selected properties of the growing clad in real-time extracted by said pattern recognition processing means, and second input signals which are the desired values of the pre-selected properties of the growing clad, and wherein the inference engine combines the fuzzified difference between said first and second input signals, and wherein the defuzzification module defuzzifies outputs of the inference engine to convert them back into quantitative values, said quantitative values being output from the intelligent process controller means and used to adjust parameters of said laser light beam, the positioning means and said powder injection means to give the desired values of the pre-selected properties of the clad.

2. The system according to claim 1 wherein said pre-selected properties of the growing clad in real-time include dimensions of the clad, roughness of the clad and rate of solidification of the clad.

3. The system according to claim 1 wherein said parameters of the laser light beam include beam size of the laser light beam focused onto the substrate surface and energy of the laser light beam.

4. The system according to claim 3 wherein said laser is a pulsed laser and wherein said parameters of the laser light beam include pulse rate of the pulsed laser and pulse duration of each laser light pulse produced by the pulsed laser.

5. The system according to claim 1 wherein said pattern recognition processing means extracts a border of a bright area between molten and non-molten regions on the surface in the images detected by the image detection means, and from the border calculating dimensions and solid/liquid interface angle ($\alpha$) between a melt pool and surface, and from the solid/liquid interface angle ($\alpha$), determining the rate of solidification.

6. The system according to claim 5 wherein said dimensions of the clad calculated by the pattern recognition processing means includes height of the clad, and wherein said intelligent process controller means adjusts the parameters of the laser light beam, substrate holder velocity, powder feed rate and orientation of powder stream directed onto the surface of the substrate in order to maintain a selected height of the melt pool, a selected angle $\alpha$ and suppress fluctuations in said height.

7. The system according to claim 1 wherein said positioning means is connected to said substrate holder for moving said substrate holder with respect to said laser beam.

8. The system according to claim 7 wherein said positioning means includes speed adjustment means for adjusting a speed of the substrate holder with respect to the laser light beam.

9. The system according to claim 7 wherein said focusing means for directing and focusing a laser light beam includes adjustable focusing optics for adjusting a beam size of the laser light beam on the surface of the substrate.

10. The system according to claim 1 wherein said laser light beam is a continuous wave (CW) or pulsed laser beam.

11. The system according to claim 1 wherein said image detection means is at least two charge coupled device (CCD) cameras positioned in a pre-selected orientation with respect to each other and the substrate surface.

12. The system according to claim 1 wherein said image detection means is a plurality of charge coupled device (CCD) cameras disposed about said substrate for capturing a plurality of images.

13. The apparatus according to claim 1 wherein said image detection means includes at least two image detectors, and wherein said image processing means includes means for projecting images received from said at least two image detectors onto a reference plane using a transformation matrix that is obtained based on orientations of the at least two image detectors with respect to a reference plane and a clad trajectory.

14. A method for producing a cladding on a substrate, comprising:
a) injecting powder onto a surface of a substrate and directing and focusing a laser light beam having effective laser light beam parameters onto the substrate surface;
b) capturing images of an interaction region between the laser light beam and the powder injected onto the substrate surface using at least two image detectors; and
c) processing the captured images of the interaction region between the laser light beam and the powder injected onto the substrate surface and extracting from the images pre-selected properties of a clad in real-time by merging of the images received from the at least two image detectors using an effective morphological structuring element neighborhood method, and to obtain therefrom two matrices, one of the matrices being a boundary matrix representing boundaries of the clad on the substrate and another matrix being an overlap matrix representing the overlap between the at least two images captured by the at least two image detectors, and calculating a difference between the extracted pre-selected properties to desired values of the pre-selected properties produced by an effective model of cladding growth by laser processing of powder, and using the difference to adjust processing parameters to give the real time values of the pre-selected properties of the clad.

15. The method according to claim 14 wherein the step of processing the captured images includes producing a binary black and white image in which black indicates one of the melting and solid areas of the clad and the substrate respectively and the white areas indicates the other.

16. The method according to claim 15 wherein the step of processing the captured images includes projection of the at least two mages received from the at least two image detectors onto a reference plane using a transformation matrix that is obtained based on orientations of the at least two image detectors with respect to the reference plane and a clad trajectory.

17. The method according to claim 16 wherein the reference plane is the plane of the surface of the substrate.

18. The method according to claim 15 wherein the step of extracting the pre-selected properties of the clad in real time includes determination of dimensions of the chad using the boundary and overlap matrices, wherein a width of the clad is determined using the boundary matrix and the combination of the boundary and overlap matrices and the binary images are used to extract height and angle ($\alpha$) of a melt pool at a solid/liquid interface between the melting area of the surface and powder and the solid area of the surface.

19. The method according to claim 18 wherein the width of the clad is calculated based on the number of bright pixels in a pre-selected column of the boundary matrix.

20. The method according to claim 18 wherein an uncalibrated height of the clad for any corresponding column in the boundary and overlap matrices is extracted by counting a number of pixels between the clad's boundary and the overlap matrices.

21. The method according to claim 20 wherein an actual height of the clad is obtained using a scaling factor of the images and angles of the image detectors with respect to the substrate to scale the uncalibrated height of the clad.

22. The method according to claim 18 wherein angle ($\alpha$) of the melt pool at the solid/liquid interface is obtained directly from the binary images captured by the at least two image detectors, and wherein the angle between a border of a bright area in a tail of the melting pool seen by each image detector and a reference horizontal line along with a relative orientation of the image detectors and a clad trajectory is used to extract the solid/liquid interface angle $\alpha$.

23. The method according to claim 18 including calibrating the at least two image detectors using an image of a standard with known dimensions, wherein after calibrating the at least two image detectors calculating a corresponding location of any pixel in the matrices.

24. The method according to claim 14 wherein the step of calculating a difference between the extracted pre-selected properties to preferred values of the pre-selected properties produced by an effective model of cladding growth by laser processing of powder includes fuzzifying the difference between the extracted pre-selected properties of a growing clad in real-time and the desired values of pre-selected properties of the growing clad, combining the fuzzified difference between the extracted pre-selected properties and the desired values of the pre-selected properties of the growing clad using an inference engine to produce fuzzified outputs, and defuzzifying the fuzzified outputs to produce quantitative values, parameters and using said quantitative values to adjust said processing parameters to give the desired values of the pre-selected properties of the clad in real time.

25. The method according to claim 24 wherein the processing parameters include parameters of the laser light beam, substrate holder velocity, powder feed rate and orientation of powder stream directed onto the surface of the substrate.

26. The method according to claim 25 wherein the parameters of the laser light beam include beam size of the laser light beam focused onto the substrate surface and energy of the laser light beam.

27. The method according to claim 25 wherein the laser light beam is a pulsed laser light beam and wherein the laser parameters include pulse rate of the laser and pulse duration of each laser light pulse.

28. The method according to claim 14 wherein the pre-selected properties of the clad include height, width, rate of solidification and clad roughness.

29. The method according to claim 25 wherein the step of adjusting the processing parameters to give desired real time clad properties includes adjusting parameters of the laser light beam, substrate holder velocity, powder feed rate and orientation of powder stream directed onto the surface of the substrate in order to maintain a pre-selected height of the melt pool and suppress fluctuations in said height.

30. The method according to claim 14 wherein said powder is a mixture of Fe and Al powders, pre-mixed to a specified bulk composition and wherein said clad is an iron-aluminum clad.

31. The method according to claim 30 wherein the substrate is mild steel.

32. The method according to claim 30 wherein the specified bulk composition is about Fe:20 wt % Al.

33. The method according to claim 30 wherein the laser beam is a pulsed laser beam.

34. A method for producing a cladding on a substrate, comprising:
a) injecting powder onto a surface of a substrate and directing and focusing a laser light beam onto the substrate surface;
b) capturing images of an interaction region between the laser light beam and the powder injected onto the substrate surface; and
c) processing the captured images of the interaction region between the laser light beam and the powder injected onto the substrate surface and extracting from the images pre-selected properties of a growing clad in real-time, and calculating a difference between the extracted pre-selected properties to desired values of the pre-selected properties produced by an effective model of cladding growth by laser processing of powder, the step of calculating the difference between the extracted pre-selected properties to preferred values of the pre-selected properties produced by an effective model of cladding growth by laser processing of powder including fuzzifying the difference between the extracted pre-selected properties of the growing clad in real-time and the desired values of the pre-selected properties of the growing clad, combining the fuzzified difference between the extracted pre-selected properties and the desired values of the pre-selected properties of the growing clad using an inference engine to produce fuzzified outputs, and defuzzifying the fuzzified outputs to produce quantitative values, and using said quantitative values to adjust processing parameters to give the desired values of the pre-selected properties of the clad.

35. The method according to claim 34 wherein the step of processing the captured images includes merging of images received from at least two image detectors using an effective morphological structuring element neighborhood method and obtaining therefrom two matrices, one of the matrices being a boundary matrix representing the clad's boundaries on the substrate and another matrix being an overlap matrix representing an overlap between the two images captured by the at least two image detectors.

36. The method according to claim 35 wherein the step of processing the captured images includes producing a binary black and white image in which black indicates one of melting and solid areas of the clad and the substrate respectively and white indicates the other.

37. The method according to claim 36 wherein the step of processing the captured images includes projection of the images received from the at least two image detectors onto a reference plane using a transformation matrix that is obtained based on orientations of the at least two image detectors with respect to the reference plane.

38. The method according to claim 37 wherein the reference plane is the plane of the surface of the substrate.

39. The method according to claim 36 wherein the step of extracting the pre-selected properties of the clad in real time includes determination of the clad's dimensions using the boundary and overlap matrices, wherein a width of the clad is determined using the boundary matrix and the combination of the boundary and overlap matrices and the binary images are used to extract height and angle ($\alpha$) of a melt pool at a solid/liquid interface between the melting area of the surface and powder and the solid area of the surface.

40. The method according to claim 39 wherein the width of the clad is calculated based on the number of bright pixels in a pre-selected column of the boundary matrix.

41. The method according to claim 39 wherein an uncalibrated height of the clad for any corresponding column in the boundary and overlap matrices is extracted by counting a number of pixels between the clad's boundary and the overlap matrices.

42. The method according to claim 41 wherein an actual height of the clad is obtained using a scaling factor of the images and angles of the image detectors with respect to the surface of the substrate to scale the uncalibrated height of the clad.

43. The method according to claim 39 wherein angle ($\alpha$) of the melt pool at the solid/liquid interface is obtained directly from the binary images captured by the at least two image detectors, and wherein the angle between a border of a bright area in a tail of the melt pool seen by each image detector and a reference horizontal line along with a relative orientation of the image detectors and a clad trajectory is used to extract the solid/liquid interface angle $\alpha$.

44. The method according to claim 39 including calibrating the at least two image detectors using an image of a standard with known dimensions, wherein after calibrating the at least two image detectors calculating a corresponding location of any pixel in the matrices.

45. The method according to claim 35 wherein the processing parameters include parameters of the laser light beam, substrate holder velocity, powder feed rate and orientation of powder stream directed onto the surface of the substrate.

46. The method according to claim 45 wherein the parameters of the laser light beam include beam size of the laser light beam focused onto the substrate surface and energy of the laser light beam.

47. The method according to claim 46 wherein the laser light beam is a pulsed laser light beam and wherein the laser parameters include pulse rate of the laser and pulse duration of each laser light pulse.

48. The method according to claim 35 wherein the pre-selected properties of the clad include height, width, rate of solidification and clad roughness.

49. The method according to claim 45 wherein the step of adjusting the processing parameters to give desired real time clad properties includes adjusting parameters of the laser light beam, substrate holder velocity, powder feed rate and orientation of powder stream directed onto the surface of the substrate in order to maintain a pre-selected height of the melt pool and suppress fluctuations in said height.

* * * * *